United States Patent [19]

Sorsa et al.

[11] 4,210,747
[45] Jul. 1, 1980

[54] PROCESS FOR THE PREPARATION OF VISCOSE

[75] Inventors: Erkki Sorsa; Esko Haukkovaara; Jan Fors, all of Valkeakoski, Finland

[73] Assignee: Kemira Oy, Helsinki, Finland

[21] Appl. No.: 930,917

[22] Filed: Aug. 4, 1978

Related U.S. Application Data

[63] Continuation of Ser. No. 773,399, Mar. 2, 1977, abandoned.

[30] Foreign Application Priority Data

Mar. 10, 1976 [FI] Finland ............................... 760623

[51] Int. Cl.² ........................... C08B 9/00; D21C 9/00
[52] U.S. Cl. ..................................... 536/60; 8/116 R; 8/116.4; 8/120; 8/181; 162/72; 162/77; 162/90
[58] Field of Search .................. 162/70, 72, 75, 76, 162/77, 90, 157 R, 157 C; 536/56, 57, 58, 84, 101, 60; 8/116 R, 196, 116.4, 120, 125, 181

[56] References Cited

U.S. PATENT DOCUMENTS

| | | | |
|---|---|---|---|
| 2,042,705 | 6/1936 | Dreyfus | 162/72 |
| 2,716,058 | 8/1955 | Rapson et al. | 162/72 |
| 2,767,170 | 10/1956 | Graybeal et al. | 536/101 |
| 2,789,902 | 4/1957 | Seymour et al. | 162/72 |
| 2,898,334 | 8/1959 | Mitchell et al. | 536/101 |
| 3,536,697 | 10/1970 | Kolosh et al. | 162/72 X |

Primary Examiner—Arthur L. Corbin
Attorney, Agent, or Firm—Bucknam and Archer

[57] ABSTRACT

A process for the preparation of viscose by adding to cellulose pulp, manufactured by alkali cooking without prehydrolysis or by acid cooking without alkali extraction, steeping lye and an organic compound, steeping the pulp to form alkali cellulose, aging the alkali cellulose, xanthating the aged alkali cellulose with carbon disulfide to obtain cellulose xanthate and dissolving the cellulose xanthate to obtain viscose.

2 Claims, No Drawings

PROCESS FOR THE PREPARATION OF VISCOSE

This is a continuation of application Ser. No. 773,399 filed Mar. 2, 1977, now abandoned.

BACKGROUND OF THE INVENTION

This invention refers to a process for the preparation of alkali cellulose from a cellulosic raw material.

In the preparation from cellulosic raw material of fibres and films consisting of regenerated cellulose, or of cellulose ethers consisting, for instance, of carboxymethyl cellulose, the first processing stage is generally the preparation of alkali cellulose. The method of preparation according to known methods is as follows:

The cellulose pulp used as a raw material is treated in a solution of sodium hydroxide (NaOH) of sufficient concentration to change the cellulose to alkali cellulose. This process, or steeping, is carried out either by submerging the sheets of cellulose in a solution of NaOH or by making a slurry of cellulose in a solution of NaOH, such that the cellulose content of the suspension, or slurry, is 5%. The concentration of the NaOH solution used in the steeping is generally in the range 17 to 22% NaOH.

The excess NaOH solution is removed by pressing so that alkali cellulose is attained in which the NaOH content is 15 to 17%. The alkali cellulose obtained is flaked or shredded.

The alkali cellulose is aged by being kept exposed to the influence of atmospheric oxygen at a temperature between 20° C. and 60° C. During the aging the molecular chains of the cellulose break down in such a way as to reduce the average size of the molecules. The average size of molecules desired is determined by variation of the temperature and duration of the aging. The reaction can be accelerated by the use of catalysts, for example salts of cobalt or manganese.

Alternatively it is possible to add to the shredded cellulose only the quantity of NaOH solution required to obtain the desired composition of alkali cellulose directly.

The usual cellulose-containing raw material used is bleached sulphite pulp or pre-hydrolysed sulphate pulp. In particular in the preparation from alkali cellulose of cellulose xanthate solution or viscose, high quality requirements are set for the cellulosic pulp used. In the preparation of viscose it is especially important that the cellulose xanthate prepared from the alkali cellulose be as completely soluble as possible in order to avoid difficulties in the filtration of the viscose. This requirement is met only by pulps specifically manufactured for the viscose industry, or so-called dissolving pulps, which are either sulphite or prehydrolyzed sulphate pulps and have an alpha-cellulose content which is generally in excess of 90%.

Other pulps, in particular sulphate pulp for the paper industry, have not been suitable in the viscose industry, because in particular with paper-grade sulphate pulp, a viscose is obtained which is of exceptionally bad filterability, containing swollen gels and insoluble fibre particles. In the case of sulphate pulp this is caused by the fact that in the alkali cooking an inadequate quantity of structurally detached areas is formed in the walls of the cellulose fibres for the formation of alkali cellulose to begin. In an acidifying cooking stage as in sulphite cooking or in acidifying pre-hydrolysis, on the other hand, these areas are formed by the removal of hemicellulose by the influence of hydrolysis.

The pulp industry, which earlier used the sulphite method (acid cooking) more than the sulphate method (alkali cooking), has continuously moved more and more to the use of the sulphate method. No new sulphite pulp factories are constructed, and old sulphite pulp factories are closed down or converted to the sulphate method. The reasons for this are both environmental and economic.

In the preparation of high alpha-cellulose content sulphite pulp or, particularly, pre-hydrolysed sulphate pulp, a part of the alpha cellulose is lost, giving a lower pulp yield. This means that the price of the finished cellulose rises in proportion to the alpha cellulose content. If the alpha cellulose content is raised by 1%, the yield falls by about 3%. The present price difference is such that dissolving pulp is approximately 30% more expensive than the normal pulp used by the paper industry. For this reason it would be advantageous to use, for example, paper-grade sulphate pulp in the preparation of alkali cellulose if there were no technical obstacles. The advantages of sulphate pulp would also be the low resin content and small polydispersity, which are important in respect of the quality of viscose fibres.

According to Finnish Pat. Nos. 41543 and 41544 it is possible with the so-called double steeping method to prepare filterable viscose also with lower quality pulps, such as normal sulphate pulp. In the process represented in these patents the alkali cellulose is steeped again after the aging. The disadvantage arises in comparison with the normal method that twice the number of steeping presses are required, leading to higher capital and running costs.

By using various additives in the steeping lye an improvement in the reactivity of the alkali cellulose has been attempted, but this has met with only slight success. The use of various additives in the steeping lye is known and to a certain extent used in the industry. Additives are used inter alia to disperse the pulp resins, to improve shredability or to improve the sulphidizing (xanthation). However, for the preparation of alkali cellulose, dissolving pulp has always been used and the quantities of additives used has been small.

Surprisingly, however, it has now been established that by the use of a certain quantity of additives in the steeping lye the reactivity of the alkali cellulose can be increased to such an extent that even by steeping paper-grade sulphate pulp a sufficiently reactive alkali cellulose can be obtained for the preparation of viscose, which previously was not possible.

One object of the invention, therefore, is to provide a method by which the raw material basis of the viscose industry may be changed from expensive, specifically-refined dissolving pulp to ordinary paper-grade pulp, which is a completely different raw material from dissolving pulp.

SUMMARY OF THE INVENTION

According to the present invention alkali cellulose is now prepared by reacting steeping lye and cellulose pulp, manufactured by alkali cooking without prehydrolysis or by acid cooking without alkali extraction, and by adding to the cellulose pulp the steeping lye and at least one organic compound which is an alcohol, an ester, an ether, a ketone, an amine, an acid or the salt of such an acid, an imine or an aliphatic hydrocarbon having at least four carbon atoms.

DESCRIPTION OF THE INVENTION

The organic compounds added in the method according to this invention normally contain a polyoxyethylene group, a polyoxypropylene group or at least one hydrophobic, e.g. aliphatic, chain in which there are at least three carbon atoms, and at least one hydrophilic group, such as a hydroxyl group, ether, oxygen or a ketone group. In addition to these, simple hydrocarbons are powerful additives.

Examples of effective organic additives in the method according to this invention are:

1. Lecithin:

Lecithin proper or phosphatidylcholine    (20%)

$$\begin{array}{l} CH_2-O-R_1 \\ | \\ CH_2-O-R_2 \\ | \\ CH_2-O-P(=O)(O^-)-O-CH_2-CH_2N^+(CH_3)_3 \end{array}$$

$R_1$ and $R_2$ linoleic acid and oleic acid   $(C_{17}H_{31-33}CO^-)$
   Phosphatidyl-ethanolamine                     (15%)
   Phosphoinositides                             (20%)
   Sugars, sterols, fatty acids etc.             (10%)
   Triglycerides                                 (ca. 35%)

2. $HO(C_2H_4O)_x(C_3H_6O)_y(C_2H_4O)_zH$
   $x \leq 50; y \leq 50; z \leq 50; x + z \leq 50$ 3. $R-(C_2H_4O)_x(C_3H_6O)_y(C_2H_4O)_zH$
   x, y and z as above.
   R = 1) $R_1-O$ — fatty alcohol, e.g. $R_1$ = myristyl, lauryl, stearyl, oleyl etc.
   2) (benzene ring with $-O-$ and $-R_2$) — alkyl phenol, e.g. $R_2$ = nonyl
   3) polyhydric alcohol, e.g. sorbitol 4. $R-N\big(\begin{array}{l}(C_2H_4O)_x(C_3H_6O)_y(C_2H_4O)_zH \\ (C_2H_4O)_x(C_3H_6O)_y(C_2H_4O)_zH\end{array}$
   x, y and z as above
   R = alkyl, aryl or alkylaryl,
   such as ethoxylate derivatives of fatty amines, e.g. myristyl, lauryl, stearyl, oleyl amines, etc.

5. $\begin{array}{l} O=C(CH_3)-CH_2-CH_2-CH(CH_3)_2 \end{array}$  methyl-isobutylketone 6. $CH_3-CH_2-CH_2CH_2-CH_2-OH$   butanol, primary and secondary amyl alcohols and alcohols higher than these, such as hexyl and octyl alcohols
   $CH_3-CH(CH_3)-CH_2-CH_2-OH$
   $CH_3-CH_2CH(OH)-CH_2-CH_3$ 7. piperidine (cyclic $CH_2-CH_2-CH_2-CH_2-CH_2-NH$)

8. $\begin{array}{l} CH_2-CH_2-O-CH_2-CH_2 \\ | \qquad\qquad\qquad\qquad | \\ OH \qquad\qquad\qquad\quad O-C_4H_7 \end{array}$   monobutylether of diethyleneglycol 9. $C_6H_{14} \longrightarrow C_{10}H_{22}$   petroleum ether
   various isomers                                boiling range 100°–120° C.

10. $\begin{array}{l} CH_2-CH_2 \\ | \quad\;\; | \\ OH \;\; O\cdot C_2H_5 \end{array}$   ethyleneglycol monoethyl ether 11. $\begin{array}{l} CH_2-CH-CH-CH-CH-CH_2 \\ |\quad\; |\quad\; |\quad\; |\quad\; |\quad\; | \\ OH\;\; OH\;\; OH\;\; OH\;\; OH\;\; OH \end{array}$   sorbitol 12. $\begin{array}{l} CH_2-CH_2O-CH_2-CH_2-O-CH_2-CH_2 \\ | \qquad\qquad\qquad\qquad\qquad\qquad\qquad | \\ OH \qquad\qquad\qquad\qquad\qquad\qquad\quad OH \end{array}$   triethyleneglycol 13. $C_3H_7-O-C_3H_7$   di-isopropyl ether 14. $(CH_2O)_x$   paraformaldehyde (= polyoxymethylene)

-continued

| | | |
|---|---|---|
| 15. | $CH_3-CH-CH_2$ and $CH_2-CH_2-CH_2$<br>    \|      \|              \|      \|      \|<br>   OH  OH           OH   OH   OH | propane diols |
| 16. | $R \cdot NH_2$ | e.g. stearyl or cyclohexyl-amines |
| 17. | $NH_2 \cdot C_6H_{12} \cdot NH_2$ | hexane diamine |
| 18. | $C_{17}H_{35}COONa$ | Na stearate |
| 19. | $NaOOC \cdot C_6H_{12} \cdot COONa$ | sodium salt of pimelic acid |
| 20. | $CH_2-OOC-C_{17}H_{33}$<br>\|<br>$CH-OOC-C_{17}H_{33}$<br>\|<br>$CH_2-OOC-C_{17}H_{33}$ | glycerol triolate |
| 21. | $(C_{12}H_{25}-N\langle\bigcirc\rangle)^+ SO_4^-$ | lauryl pyridinium sulphate |
| 22. | $R_1 \cdot CH \cdot COOR_2$<br>\|<br>$SO_3Na$ | sodium salt of sulphonated alkylester |

Of these additives lecithin has proved most advantageous.

Phosphatidylcholine, phosphatidylethanolamine, phosphoinositide, sugar, sterol, fatty cids, triglycerides or a mixture thereof is added to advantage at 0.01–20% of the quantity of alpha cellulose, whereas organic ethers, esters, ketones, alcohols and/or derivatives of pyridine are added, depending on their quality, at 0.1–100% of the quantity of alpha cellulose. The present application covers a process for the preparation of viscose from paper grade pulp which is obtained by alkali cooking without prehydrolysis or by acid cooking without alkali extraction which consists of adding to said pulp steeping lye in excess of the amount required for steeping the pulp and at least one organic compound selected from the group consisting of alcohols, esters, ethers, ketones, imines, amines, acids and salts thereof, and aliphatic hydrocarbons containing at least four carbon atoms, steeping to form alkali cellulose, removing excess alkali, recovering alkali cellulose, aging said alkali cellulose, xanthating with carbon disulfide in an amount of 20–35% of the quantity of alpha cellulose to obtain cellulose xanthate and dissolving said cellulose xanthate.

According to one embodiment of the invention, the organic compound is an ether, an ester, a ketone, an amine, an acid or the sodium salt thereof, an alcohol, a pyridine derivative or a mixture thereof, and the compound is added in an amount from 0.1% to 100% by weight with respect to the quantity of alpha cellulose in the pulp.

According to another embodiment of the invention, the organic compound is added in amount of 0.01% to 20% by weight with respect to the quantity of alpha cellulose in the pulp and the organic compound is a phosphatidylcholine, a phosphatidylethanolamine, a phosphoinositide, a sugar, a sterol, a fatty acid, a triglyceride or a mixture thereof.

According to another embodiment of the invention the compound contains at least one hydrophobic chain having at least three carbon atoms and at least one hydrophilic group.

In association with this discovery it has also surprisingly been noted that the increasing effect which the substances mentioned in the invention have on the reactivity of the alkali cellulose can also be exploited when dissolving pulp is the raw material, so that, for example, in the preparation of viscose the quantity of carbon disulphide used may be reduced to about 20–35% of the quantity of alpha cellulose and a lower NaOH content in the viscose than usual can be used.

The invention is explained in more detail hereinafter by way of the following examples.

EXAMPLES

In the accompanying trial examples the filterability or KW value given is not a standardised measurement, but one whose value depends on specific parameters. The filterability values used here may be grouped as follows:

| KW value | Filterability |
|---|---|
| 0–50 | Excellent |
| 50–100 | Good |
| 100–150 | Average |
| 150–300 | Poor |
| 300–800 | Very poor |
| >800 | Unfilterable |

Example 1

Normal bleached pine sulphate pulp as used by the paper industry, with an alpha cellulose content of about 87%, was steeped as a 4% suspension in a steeping lye of concentration 225 g NaOH per liter at a temperature of 35° C. for 30 minutes. The steeping lye also contained 10 g per liter, i.e. 25% of the weight of alpha cellulose, of an alkylene oxide fatty alcohol additive known by the trade name of Marlox FK 64 and manufactured by Chemische Werke Hüls AG. From the alkali cellulose suspension an alkali cellulose was made which was pressed at a pressing ratio of 3.2. The pressing ratio is the weight of pressed alkali cellulose to the original air dry pulp. The slightly shredded alkali cellulose was aged for 18 hours at +40° C. and xanthated for 2 hours at +35° C. using a quantity of carbon disulphide equal to 35% of the quantity of the alpha cellulose, then dissolved to viscose containing 5.3% NaOH and 10.2% cellulose, with a viscosity by the falling ball method of 48 seconds. The filterability or KW value of the viscose was 39.

In the same manner a control viscose was prepared, but without the addition of Marlox FK 64, which had a KW value of 2778.

Example 2

Viscose was prepared in the same manner as for example 1, but in place of the Marlox FK 64 the steeping lye contained 10 g per liter, i.e. 25% of the weight of alpha cellulose, of a polypropylene glycol of average molecular weight 400, manufactured by Shell Chemical Co. The viscose contained 5.2% NaOH and 9.6% cellulose, and the viscosity by the falling ball method was 68 seconds. The KW value of the viscose was 52.

Example 3

Viscose was prepared in the same manner as for example 1, but in the place of Marlox FK 64 the steeping lye contained 10 g per litre, i.e. 25% of the weight of the alpha cellulose, of diethyleneglycol monobutylether. The viscose contained 5.0% NaOH and 9.8% cellulose, with viscosity by the falling ball method of 57 seconds. The KW value of the viscose was 51.

Example 4

Viscose was prepared in the same manner as for example 1, but in the place of Marlox FK 64 the steeping lye contained 10 g per liter, i.e. 25% of the weight of alpha cellulose, of a mixture of secondary amyl alcohol isomers containing about 60% pentanol-2 and about 36% pentanol-3. The viscose contained 5.3% NaOH and 9.9% cellulose, with a viscosity by the falling ball method of 60 seconds. The KW value of the viscose was 53.

Example 5

Viscose was prepared in the same manner as for example 1, but in the place of Marlox FK 64 the steeping lye contained 10 g per liter, i.e. 25% of the weight of alpha cellulose, of a mixture of aliphatic hydrocarbons (petroleum ether) with a boiling point between $+100°$ and $+120°$ C. The viscose contained 5.2% NaOh and 9.7% cellulose, with a viscosity by the falling bali method of 76 seconds. The KW value of the viscose was 75.

Example 6

Viscose was prepared in the same manner as for example 1, but in the place of the Marlox FK 64 the steeping lye contained 10 g per liter, i.e. 25% of the weight of alpha cellulose, of piperidine. The viscose contained 5.4% NaOH and 9.5% cellulose, with a viscosity by the falling ball method of 60 seconds. The KW value of the viscose was 69.

Example 7

Viscose was prepared in the same manner as for example 1, but in the place of Marlox FK 64 the steeping lye contained 10 g per liter, i.e. 25% of the weight of alpha cellulose, of a polyethyleneoxide polypropyleneoxide mixed polymer known by the trade name of Genapol PF 10 and manufactured by Farbwerke Hoechst AG. The viscose contained 5.1% NaOH and 9.8% cellulose, and the viscosity by the falling ball method was 42 seconds. The KW value of the viscose was 37.

Example 8

Viscose was prepared in the same manner as for example 1, but in the place of Marlox FK 64 the steeping lye contained 10 g per liter, i.e. 25% of the weight of alpha cellulose, of a ethoxylated fatty amine known by the trade name of Berol Visco 32 and manufactured by Berol Kemi AB. The viscose contained 4.8% NaOH and 9.8% cellulose, with a viscosity by the falling ball method of 47 seconds. The KW value of the viscose was 61.

Example 9

Viscose was prepared in the same manner as for example 1, but in the place of Marlox FK 64 the steeping lye contained 0.2 per liter, i.e. 0.50% of the weight of alpha cellulose, of an ethoxylated oleyl amine known by the trade name of Genamin 0-020 and manufactured by Farbwerke Hoechst AG. The viscose contained 5.4% NaOH and 9.6% cellulose, with a viscosity by the falling ball method of 57 seconds. The KW value of the viscose was 50.

Example 10

Viscose was prepared in the same manner as for example 1, but in the place of Marlox FK 64 the steeping lye contained 10 g per liter, i.e. 25% of the weight of alpha cellulose, of a sodium salt of sulphonated alkyl ester, known by the trade name of Berol VMA-478 and manufactured by Berol Kemi AB. The viscose contained 5.2% NaOH and 9.7% cellulose, and the viscosity by the falling ball method was 43 seconds. The KW value of the viscose was 19.

Example 11

Viscose was prepared in the same manner as for example 1, but in the place of Marlox FK 64 the steeping lye contained 10 g per liter, i.e. 25% of the weight of alpha cellulose, of an alkyleneoxide alkyl phenol additive known by the trade name of Marlox NP 109 and manufactured by Chemische Werke Hüls AG. The viscose contained 5.3% NaOH and 10.4% cellulose, with a viscosity by the falling ball method of 46 seconds. The KW value of the viscose was 59.

Example 12

Viscose was prepared in the same manner as for example 1, but in the place of Marlox FK 64 the steeping dye contained 0.1 g per liter, i.e. 0.25% of the weight of alpha cellulose, of technical grade soya lecithin of 35% fat content. The viscose contained 5.0% NaOH and 9.5% cellulose, with a viscosity by the falling ball method of 23 seconds. The KW value of the viscose was 47.

A control viscose was prepared in the same manner but without the addition of lecithin, giving a KW value of 2000.

Example 13

From normal bleached birch sulphate pulp as used by the paper industry, with an alpha cellulose content of about 87%, viscose was prepared in the same manner as for example 1, but in the place of Marlox FK 64 the steeping lye contained 10 gper liter, i.e. 25% of the weight of alpha cellulose, of methyl isobutylketone. The viscose contained 5.1% NaOH and 9.4% cellulose, with a viscosity by the falling ball method of 20 seconds. The KW value of the viscose was 60.

A control viscose prepared in the same manner but without the addition of methyl-ixobutyl-ketone had a KW value of 1024.

Example 14

Viscose was prepared in the same manner as for example 13, but in the place of methyl-isobutyl-ketone the steeping lye contained 10 g per liter, i.e. 25% of the weight of alpha cellulose of a technical-grade mixture of primary amyl alcohol isomers manufactured by Union Carbide Chemicals Co. and containing approximately 60% pentanol-1 and 40% 2- and 3-methylbutanol-1. The viscose contained 4.5% NaOH and 9.4% cellulose, with a viscosity by the falling ball method of 13 seconds. The KW value of the viscose was 49.

Example 15

Normal bleached pine sulphate pulp, as used by the paper industry, with an alpha cellulose content of about 87%, was steeped as a 4% suspension in a steeping lye of strength 225 g NaOH per liter, hemicellulose content 32 g per liter, at a temperature of +55° C. for 30 minutes. The steeping lye contained 0.2 g per liter, i.e. 0.50% of the weight of alpha cellulose, of technical grade soya lecithin from which the fatty content had been removed by extraction with acetone. The alkali cellulose was pressed, aged and xanthated in the same manner as in example 1. The viscose contained 5.3% NaOH and 9.6% cellulose, with a viscosity by the falling ball method of 37 seconds. The KW value of the viscose was 82.

Example 16

Coniferous wood sulphite dissolving pulp was steeped as a 4% suspension for 10 minutes in a steeping lye of strength 225g NaOH per liter at a temperature of 25° C. The steeping lye contained 0.1g per liter, i.e. 0.25% of the weight of alpha cellulose, of technical grade soya lecithin. Alkali cellulose was prepared from the suspension in the same manner as for example 1. After aging the alkali cellulose was xanthated with a quantity of carbon disulphide equal to 25% of the weight of alpha cellulose, and the xanthogenate obtained was dissolved to viscose, which contained 5.1% NaOH and 9.6% cellulose, with a viscosity by the falling ball method of 60 seconds. The KW value of the viscose was 58.

A control viscose was prepared in the same manner but without the addition of lecithin in the steeping lye, and gave a KW value of 283.

What is claimed is:

1. A process for the preparation of viscose from paper grade pulp, prepared by alkali cooking without prehydrolysis, which consists of adding to said pulp, steeping lye in excess of the amount required for steeping the pulp and an organic compound which is a member selected from the group consisting of a phosphatidylcholine, diethylene glycol monobutylether, methyl isobutylketone, a mixture of primary amyl alcohol isomers containing 60% pentanol-1 and 40% 2- and 3-methylbutanol-1, a mixture of secondary amyl alcohol isomers containing about 60% 2-pentanol and about 36% 3-pentanol, and piperidine, steeping said pulp to form alkali cellulose, removing excess alkali, recovering alkali cellulose, aging said alkali cellulose, xanthating said aged alkali cellulose with carbon disulfide in an amount of 20–35% of the quantity of alpha cellulose presentin the recovered alkali cellulose to obtain cellulose xanthate and dissolving said cellulose xanthate to obtain viscose.

2. The process according to claim 1 wherein said compound is lecithin.

* * * * *